Figure 1:
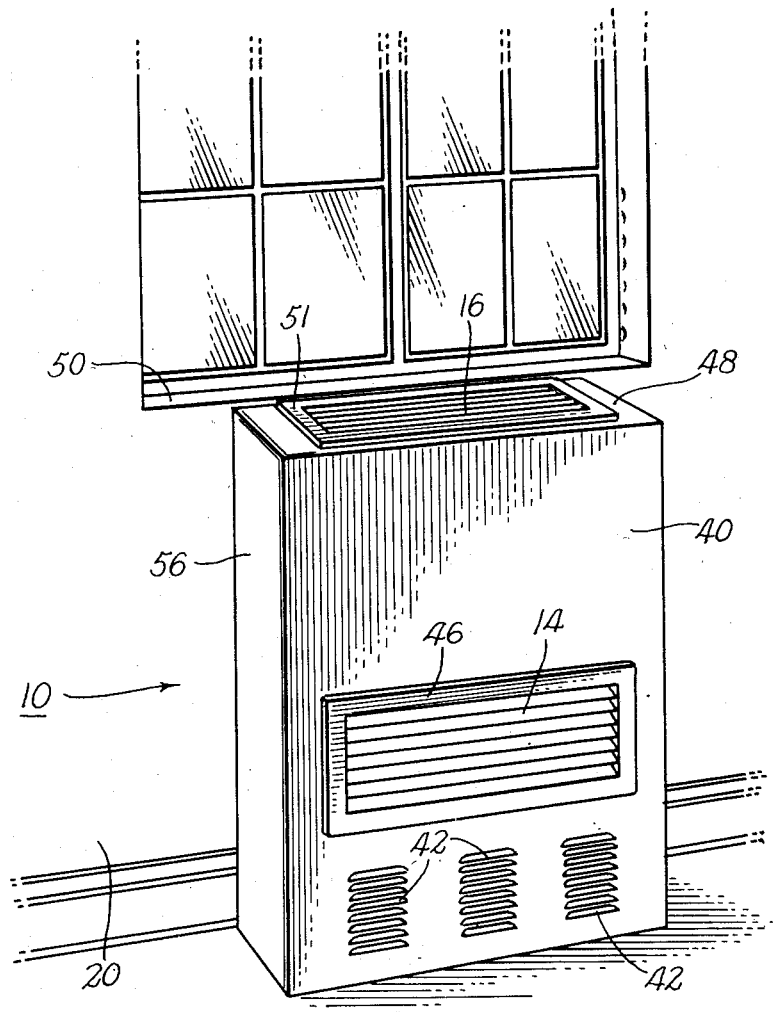

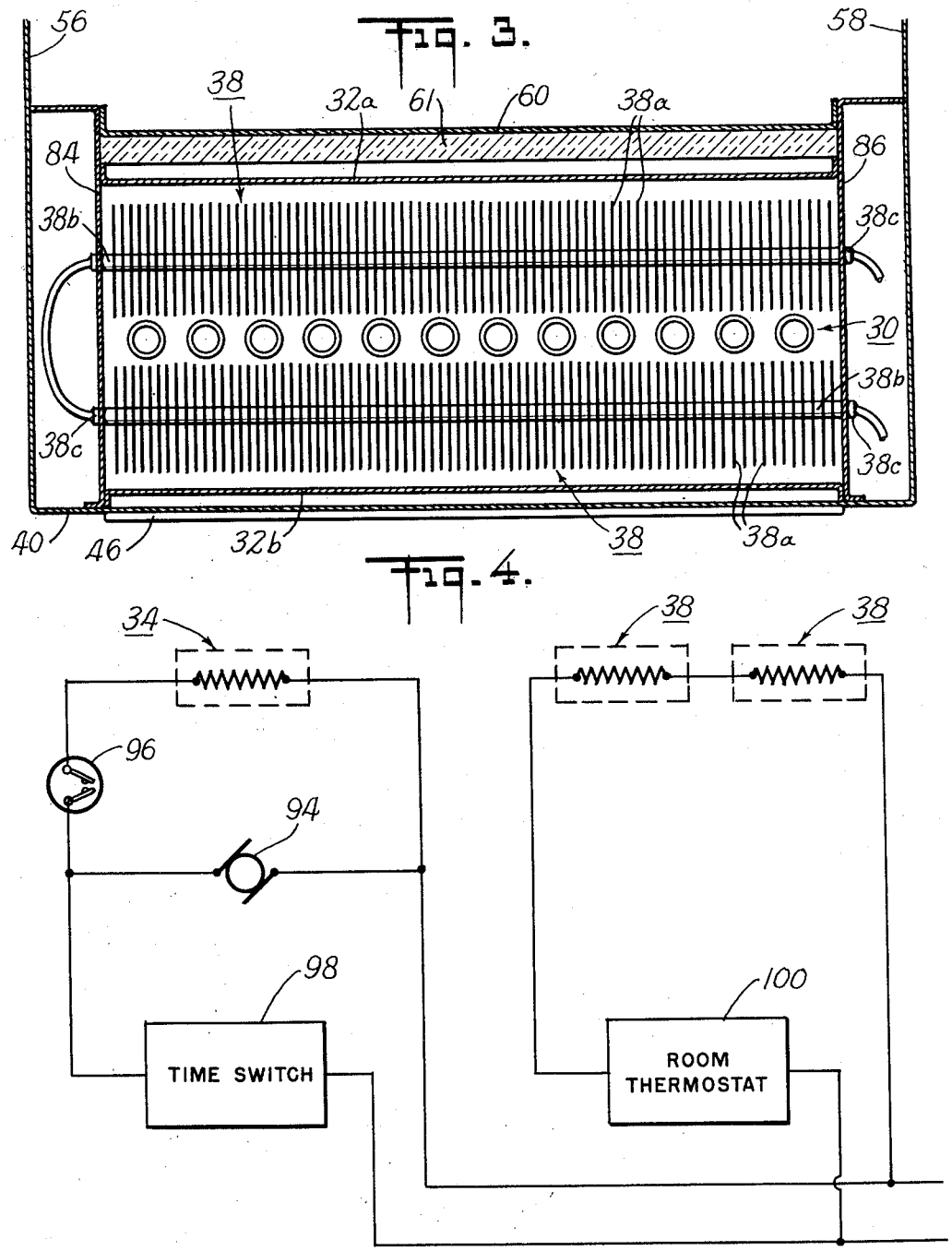

United States Patent Office 2,820,880
Patented Jan. 21, 1958

2,820,880

SPACE HEATER

Charles E. Huntsinger and Robert L. Boyd, Jr., Rochester, N. Y., assignors to Commercial Controls Corporation, Rochester, N. Y.

Application January 20, 1956, Serial No. 560,443

28 Claims. (Cl. 219—39)

This invention relates to a space heater, preferably of the electrical type, and more particularly to an electrical heater of the forced air type adapted for installation adjacent the outside wall of a room for fresh air intake and circulation.

Many heaters and radiators have been designed utilizing one or more of the three basic types of heating, i. e. convection, conduction and radiation, all for use in heating an enclosure such as one or more rooms. But a majority of these suffer from failure to maintain an even temperature throughout the room, leaving cold and hot areas, even while operating under the most favorable conditions. In a large room it is desirable and usually necessary to employ positive air circulation via fans, or the like, and in order to maintain the entire room at a comfortable temperature level, large fans are often required because of the poor design of the heaters thus consuming too much power. It is often desirable to circulate constantly a quantity of tempered fresh air, particularly in rooms occupied by a proportionately large number of persons per unit of cubage, and heaters attempting to do this in the past have been unable to deliver the desired quantity of such fresh air at proper temperature. Past heaters of the general type disclosed herein have been unduly complicated with dampers, damper motors and other expensive and complicated components and have required extensive special building structure or the custom building of individual heaters for each application. Because past heaters have been notably inefficient in their utilization of heat energy consumed they have been expensive in operation and hence impractical.

It is an object of this invention to provide a heater preferably of the blower type capable of supplying an adequate quantity of fresh air to maintain a comfortable atmospheric condition in a room to be heated. It is another object of this invention to provide a heater of the above character which mixes an adequate supply of fresh air from the outside with re-circulated air by way of blowers used in the re-circulation operation. Another object of the above invention is to provide heating apparatus of the above character including provision for heating the re-circulated room air and a separate secondary heater for tempering the incoming fresh air to be mixed therewith. A further object of the above invention is to provide a heater of the above character for heating and mixing incoming fresh air with re-circulated air and controlling the temperature of the fresh air independently of room control. Another object of the above invention is to provide a heater of the above character which may operate for positive re-circulation of the air throughout the room being heated either by blowing or forced air ventilation or natural convection currents. Another object of the above invention is to provide a heater of the above character which is particularly well-suited for utilization of electrical heating elements. An additional object of the above invention is to provide a heater of the above character which admits negligible quantities of outside air when the fan is inoperative. Even with high wind directed at the outside air opening it deflects the major portion of the air, such negligible quantities as are unavoidably admitted being unobjectionable. A still further object of the above invention is to provide a heater of the above character which may be installed with ease in a recess similar to the standard radiator recess provided in normal building construction. Other objects will be in part obvious and in part pointed out hereinafter.

The invention accordingly comprises the features of construction, combinations of elements and arrangements of parts which will be exemplified in the construction hereinafter set forth, and the scope of the invention will be indicated in the claims.

Figure 2:
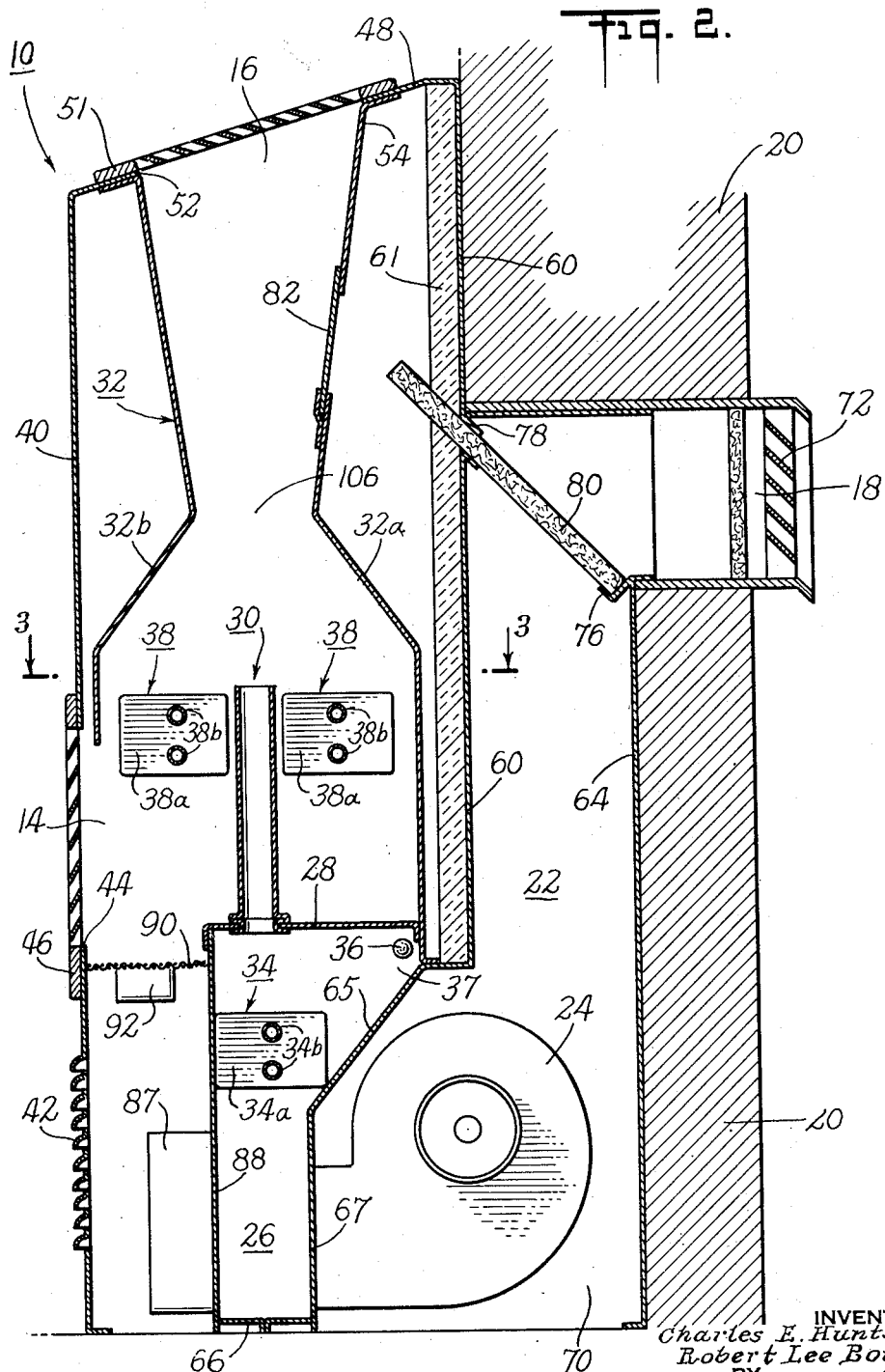

For a fuller understanding of the nature and objects of the invention, reference should be had to the following detailed description taken in connection with the accompanying drawings in which:

Figure 1 is a perspective view, partially fragmentary, of a heater having the features of this invention embodied therein as installed by the window of a room to be heated, Figure 2 is a vertical sectional view of the heater shown in Figure 1 on an enlarged scale and as installed in a recess in the outside wall of a room to be heated, Figure 3 is a horizontal sectional view taken along the line 3—3 of Figure 2, and Figure 4 is a wiring diagram of the preferred control circuits used in regulating the heating elements and blowing equipment.

Similar reference characters refer to similar parts throughout the several views of the drawings.

The general construction of the heating apparatus may be understood from a consideration of Figures 1 and 2, wherein the casing, generally indicated at 10, includes a room air inlet 14 in the lower front portion and an upper air outlet 16 in the top thereof. A fresh air inlet, generally indicated at 18 (Figure 2) extends through the outside wall 20 of the room and is connected to a vertical duct, generally indicated at 22, leading to the bottom of the casing where fans, generally indicated at 24, are located. The outlets (not shown) of fans 24 are connected to a central passageway, generally indicated at 26, closed from the interior of the casing 10 by a cover, generally indicated at 28. A plurality of vertically disposed tubes, generally indicated at 30, extend upwardly from cover 28, their upper ends opening into an interior casing, generally indicated at 32, connected to air outlet 16 as best seen in Figure 2. A fresh air heating element, generally indicated at 34 is located in central passageway 26 above the outlets of fans 24 and this heater is under the control of a thermostatic switch having a thermostatic heat sensitive bulb 36. Bulb 36 is located in a horizontally extending passage 37 connected with central passageway 26. Air rushing through passageway 26 from fans 24 constantly brushes bulb 36 so that this thermostatic bulb is always in contact with the incoming outside air. The main heating elements, generally indicated at 38, disposed in interior casing 32 may be under the control of a room thermostat.

As will be described more fully hereinafter fans 24 and the fresh air heater 34 are preferably under the control of a time switch so that they may be automatically placed in operation during the time of day when the room to be heated is occupied. The thermostatic bulb 36 and associated switching mechanism to be described is set to control fresh air heating element 34 so that air drawn by blowers 24 from the outside is tempered or brought up to a desired temperature, say 60° F., before being forced out through tubes 30 and eventually into the room via outlet 16. As this air rushes up through the interior casing 32, it is mixed with and tends to pull with it room air entering through the inlet 14. The re-circulated air from the room is heated by the main heating elements 38 and combined with the fresh air to be delivered throughout the room via exit 16. Not only does this apparatus provide for even distribution of air throughout the room to maintain a constant temperature therein but it efficiently mixes fresh outside tempered air with the re-circulated room air to assure a fresh atmosphere in the room at all times. Furthermore, due to its novel controlling arrangement to be presently described in detail, outside air is drawn into the room as needed and such air is heated to a desired temperature before being mixed with the re-circulated air. Further still when no outside air is desired, this apparatus may be operated as a convection heater, fans 24 being inoperative, where the room thermostat merely controls the operation of the main heating elements 38 to thereby heat the convection currents entering through the inlet 14 and passing out to the room through the outlet 16.

Referring now to Figures 1 and 2 in detail, the casing 10 includes a front piece 40 having lower fluting 42 formed therein and an opening 44 which, together with a fluted cover 46, forms the room air inlet 14. Casing 10 has a top 48 which preferably slants upwardly to be substantially flush with a window sill 50 as seen in Figure 1. Top 48 is provided with an opening 52 (Figure 2) having a fluted cover 51 fitting thereover to form the air outlet 16. Also, the upper end 54 of interior casing 32, fits against the inner surface of top 48 and about the opening 52.

As can be seen in Figures 2 and 3, casing 10 has sidewalls 56 and 58 merging with top 48 and resting flush against a rear wall 60 thereof having insulation 61. Referring to Figure 2 wall 60 extends downwardly beside wall 20 to terminate above a recess 78 in the lower portion of casing 10. A rear wall 64 parallel with but spaced rearwardly from wall 60 completes vertical duct 22; this rear wall 64 may be an integral part of the casing or detachable therefrom as desired. A forwardly slanting wall 65 is connected to a vertical plate 67 in any desirable manner, plate 67 being in turn connected to the outlets of fans 24 which rest upon and are secured to base 66. It will now be seen that vertical duct 22 occupies a space not unlike the recess frequently provided for conventional radiators and it merges into a larger space 70 at the bottom of casing 10 to accommodate the fans 24 and to provide adequate room for the fresh air to enter the fan inlets, then to be discharged into the center passageway 26.

Fresh air inlet 18 is horizontally disposed between rear walls 60 and 64, thus extending through the outside wall 20 and preferably having a grill 72, of any suitable construction, designed for protection from inclement weather such as driving rain. An angularly disposed flange 76 is formed on the top of rear wall 64 adjacent the lower side of fresh air inlet 18 and rear wall 60 has a slot 78 formed therein adjacent the top side of inlet 18 as can be seen in Figure 2. Thus flange 76 supports a filter 80 which rests in slot 78 and which may be removed by way of a gate 82 formed in interior casing 32 as seen in Figure 2.

Heating elements 34 and 38 may be of any suitable construction but as best seen in Figures 2 and 3 they are preferably of the molded type, having fins 34a and 38a with heating elements 34b and 38b extending therethrough. Referring to Figure 3 a pair of vertically disposed partitions 84 and 86 are mounted in casing 10 and spaced inwardly from side walls 56 and 58. These partitions 84 and 86 support heating elements 34 and 38; thus as best seen in Figure 3, elements 38 have central extensions 38c extending from their opposite ends into partitions 84 and 86 to which they are secured in any suitable manner. Thus elements 38 are reliably supported in the position shown in Figures 2 and 3 and similar structure (not shown) is preferably utilized to support heating element 34 in the position shown in Figure 2. The controls consisting of switches and relays to be described, are preferably mounted in a suitable box 87 fastened to the front 88 of passage 26. A screen 90 mounted within casing 10 (Figure 2) supports a box 92 which holds the thermostatic switching equipment adapted to operate in conjunction with thermostatic bulb 36, as will now be described in greater detail.

Turning now to Figure 4, there is shown a preferred controlling circuit for heaters 34 and 38, fans 24 and related equipment. Thus fresh air heating element 34 is connected in parallel with motors 94 for fans 24 and a thermostatic switch 96 associated with thermostatic bulb 36 (Figure 2) is in series with heating element 34. A time switch 98 is in the circuit of motors 94 and heating element 34. A room thermostatic switch 100, of standard construction is in the circuit of and hence controls heating elements 38; this switch is preferably remote from the apparatus and responsive to room temperature. Manual controls may replace these automatic controls if desired.

While the described heating apparatus is admirably suited for a variety of applications, one of its important uses is the heating of a school class room. When so used the time switch may be set to close at eight in the morning and open at four in the afternoon to assure efficient operation and maximum comfort conditions when the room is occupied. When time switch 98 is closed, motors 94 are energized to operate the fans 24 continuously. Let it be further assumed that thermostatic switch 96 is adjusted to close at any temperature below 60° F. Under these circumstances if the air entering through inlet 18 and passage 22 is below 60°, thermostatic switch 96 will close and heating element 34 will heat the incoming air to temper it before it passes up through the tubes 30 for circulation in the room. On the other hand, if the incoming air is at 60° or above, thermostatic switch 96 will remain open and heating element 34 will be inoperative. Thus thermostatic switch 96 controls the operation of heating element 34 to maintain incoming fresh air at 60°. Heating elements 38 operate in a well known manner under the control of room thermostat 100, i. e. they operate whenever this thermostat calls for heat.

It will now be apparent that when fans 24 are operating the tempered air is forced through tubes 30 and thence rushes upwardly through interior casing 32. It will be noted that interior casing 32 is inclined inwardly in both directions to form a comparatively narrow neck portion 106. This creates a venturi action through the interior casing increasing the velocity of the air as it passes therethrough thereby tending to suck in a greater quantity of room air through the inlet 14 for heating and re-circulation. As the room air enters and flows upwardly around the heating elements, it tends to strike the inwardly sloping sides 32a and 32b of interior casing 32 where it intermixes thoroughly with the fresh air rushing out from tubes 30. The result is a thorough inter-mixture of the fresh, tempered air and the re-circulated room air which mixture then emerges through outlet 16 for circulation throughout the room. Accordingly when the heater is being operated in this manner it serves to heat and constantly circulate a substantial quantity of fresh air throughout the room to maintain the room at a comfortable temperature and well ventilated.

When the time switch 98 cuts off, the fans 24 become inoperative and as no fresh air passes through central passageway 26 from the outside, thermostatic switch 96 will remain open and heater 34 inoperative. If, during this period the room thermostat 100 calls for heat the heating elements 38 will operate. Under such circumstances, room air will be circulated through inlet 14, interior casing 32 and outlet 16 by convection. Such convection circulation is adequate to maintain the room at desired temperatures when not occupied. It will be noted that the circuitous path the fresh air must travel from the inlet 18 to the outlet 16 impedes air flow considerably to avoid drafts when the fans 24 and heating element 34 are inoperative.

It will thus be seen that we have provided heating apparatus which is admirably suited for the heating of a room and the circulation of adequate quantities of fresh air at a comfortable temperature. Furthermore, this heating apparatus is simple in construction and lends itself to economical manufacture. It is well suited for installation in the heating recess found in modern building construction. It is compart and presents a pleasing appearance and is adapted to operate as a ventilator whether or not heating is required. The parts are readily accessible and hence may be easily serviced. Accordingly, we have provided apparatus in which several objects hereinabove referred to have been successfully and practically accomplished.

Since certain changes may be made in the construction which has been described without departing from the scope of the invention, it is intended that all matter contained in the above description or shown in the accompanying drawing shall be interpreted as illustrative and not in a limiting sense.

We claim:

1. In a room heater-ventilator, in combination, a casing adapted for installation adjacent the wall of a room, ducting adapted for connecting said casing with the outside air, a fan located to draw air from the outside through said ducting through said casing and thence to force it upwardly and out into the room, a heating element in the path of said fresh air, and thermostatic controlling means for said heating element exclusively responsive to the temperature of said fresh air.

2. In a room heater-ventilator, in combination, a casing adapted for connection with the outside air, a fan located in the lower portion of said casing and adapted to draw outside air therein, means forming a central passage in said casing connected to the outlet of said fan, a heating element in said passage, means forming an outlet from said passage into the upper portion of said casing, means forming a room air inlet adjacent said last mentioned means, means forming an air outlet in the top of said casing, and means so located as to be exclusively responsive to the temperature of said incoming outside air for controlling the heating characteristics of said heating element.

3. The combination defined in claim 2 in which there are additional heating elements adjacent said room air inlet under the control of a room thermostat.

4. In a room heater-ventilator, in combination, a casing shaped to fit adjacent the outside wall of the room to be heated and ventilated, means adapted to form a connection between said casing through said wall to the outside air, a fan for drawing fresh air into the casing through said connection, a central passage connected to the outlet of said fan, said passage opening into the central portion of said casing, means forming a room air inlet substantially adjacent said central portion of said casing, means forming an air outlet adjacent the top said casing, a heating element in said central passage, and thermostatic means responsive to the temperature of the incoming fresh air for controlling said heating element.

5. The combination defined in claim 4 in which the upper interior portion of said casing is constricted to increase the velocity of air passing therethrough and to thereby accelerate the flow of room air through said room air inlet.

6. In a room heater-ventilator, in combination, a casing, a duct for connecting said casing to the fresh outside air, a fan located to draw air from the outside through said duct into said casing thence to force it upwardly through said casing and out into the room, a heating element in the path of said fresh air, thermostatic means responsive to the temperature of said fresh air only for controlling said heating element, and an additional heating element supported in said casing above said first mentioned heating element to heat room air circulating therethrough said additional heating element adapted to respond to a room thermostat.

7. In a room heater-ventilator, in combination, a casing, a duct for connecting said casing with the outside air, a fan located in the lower portion of said casing, means forming a central passage from the outlet of said fan upwardly into the interior of said casing, means forming a room air inlet in the central portion of said casing, means forming an air outlet in the top of said casing, a heating element disposed in said central passage for heating incoming fresh air, and heating elements disposed in said casing above said central passage and located to heat incoming room air from said room air inlet before it is forced outwardly through said upper opening.

8. In a room heater-ventilator, in combination, a casing, a duct for connecting the interior of said casing with the outside air, a fan in the lower portion of said casing, means forming a central passage from the outlet of said fan upwardly into the interior of said casing, means forming a room air inlet in the central portion of said casing, means forming an air outlet in the top portion of said casing, a heating element disposed in said central passage for heating incoming fresh air, the lateral cross-sectional area of the interior of said casing above the upper opening of said passage and above said room air inlet being smaller than the corresponding area therebelow whereby the velocity of said outside air is increased to accelerate the air entering said room air inlet.

9. The combination defined in claim 8 in which the upper outlet of said central passage is located above said room air inlet in said casing.

10. In a room heater-ventilator, in combination, a casing having a constricted portion between its top and bottom, means forming a room air inlet below said constricted portion, means forming an air outlet above said constricted portion, and a fan located to draw fresh air in from the outside and force it upwardly through said constricted portion whereby the increased velocity of the air passing through said constricted portion draws air in from the room through said air inlet.

11. In a room heater-ventilator, in combination, a casing having a constricted portion between its top and bottom, means forming a room air inlet below said constricted portion, means forming an air outlet above said portion, means forming a fresh air inlet connected to said casing, a fan having its inlet connected to said last-mentioned fresh air inlet, a vertically extending central passage connected to the outlet of said fan and extending upwardly above said room air inlet and beneath said constricted portion, a heater in said passage, and means responsive to the temperature of said fresh air for controlling said heater.

12. The combination defined in claim 11 in which there are heating elements located in said casing beneath said constricted portion.

13. In a room heater-ventilator, in combination, a casing adapted to be connected to the outside air, a heating element in said casing, a fan adapted to draw fresh air into said casing past said heating element and thence outwardly through an outlet in said casing, means forming a room air inlet in said casing, means comprising main heating elements in said casing for re-circulated room air, and a thermostat for controlling the operation of said first-mentioned heating element primarily in response to the temperature of the fresh air being forced through the casing by said fan.

14. In a room heater-ventilator, in combination, a casing adapted to be connected to the outside air, a heating element in said casing, a fan adapted to draw fresh air into said casing past said heating element, through said casing, and thence upwardly through an outlet in said casing, means forming a room air inlet in said casing, means comprising main heating elements in said casing above said first-mentioned heating element for heating re-circulated air from said room, a thermostat for controlling the operation of said first-mentioned heating element in response to the temperature of the fresh air being forced through the casing by said fan, and a time switch for controlling the operation of said fan.

15. In a room heater-ventilator, in combination, a casing adapted to be connected to the outside air, a heating element in said casing, a fan adapted to draw fresh air into said casing past said heating element, through said casing, and thence outwardly through an outlet in said casing, means forming a room air inlet in said casing, means comprising main heating elements in said casing located above said first-mentioned heating element for heating re-circulated room air, a thermostat for controlling the operation of said first-mentioned heating element primarily in response to the temperature of said fresh air being forced through the casing by said fan, and thermostatic means responsive to room temperature for controlling said main heating elements.

16. In a room heater-ventilator, in combination, a casing adapted to be connected to the outside air, a fan adjacent the bottom of said casing, means forming a central passage extending from the outlet of said fan upwardly into said casing, a heating element in said passage, the portion of said casing substantially above said passage being constricted, a plurality of open-ended tubes connected to the top of said passage and extending upwardly to a point beneath said constricted portion, means forming a room air inlet in said casing, heating elements in said casing adjacent said tubes and said room air inlet for heating the re-circulated air from said room, means forming an air outlet at the top of said casing above said constricted portion, and thermostatic means for controlling the operation of said first-mentioned heating element in response to the temperature of the fresh air entering the casing.

17. In the combination defined in claim 16 in which the heating elements are electrical.

18. The combination defined in claim 17 in which said electrical heating elements are molded fin-type units supported by the side walls of said casing to be suspended crosswise thereof.

19. In a room heater-ventilator, in combination, a casing adapted to be connected to the outside air, heating elements supported in said casing, means forming a passage directing said fresh air into said casing at a point above said heating element, and means forming a room air inlet in said casing at a point below said heating element to direct air therepast before its mixture with said fresh air.

20. In a space heater-ventilator, in combination, a casing adapted to be connected to the outside air, a heater in said casing, a fan in said casing adapted to pull fresh air into said casing, an air inlet in said casing from the space to be heated, an air outlet to said space in said casing above said air inlet, and means associated with the outlet of said fan for directing outside air toward said space outlet through said casing at such velocity as to pull room air into said casing through said air inlet whereby room air and outside air are mixed in said casing before leaving via said air outlet.

21. The combination defined in claim 20 in which said casing has a vertical surface parallel to the wall of a room, and a top substantially horizontal surface with said air inlet in said vertical surface and said outlet in said top surface.

22. The combination defined in claim 20 in which there is thermostatic means adapted to control said heater and positioned in said casing to sense the temperature of the incoming outside air whereby said heater cuts out when the outside air is above a minimum temperature.

23. In a space heater-ventilator, in combination, a casing, means forming a fresh air inlet in said casing, means forming an outlet from said casing to the space to be heated, means forming an inlet in said casing from said space, a fan having its intake side connected to said fresh air inlet, and means forming a ducting system connected to the exhaust end of said fan including a plurality of substantially vertically disposed open ended tubular members extending in the direction of said outlet.

24. The combination defined in claim 23 in which said inlet is disposed below the open ends of said tubular members.

25. The combination defined in claim 23 in which said casing has a restricted portion between the open ends of said tubular members and said air outlet.

26. The combination defined in claim 25 wherein said air inlet is below said outlets of said tubular members and to one side thereof.

27. The combination defined in claim 20 in which said air inlet is closer to the bottom of the casing.

28. The combination defined in claim 22 in which said thermostatic means is independent of any room thermostat control.

References Cited in the file of this patent

UNITED STATES PATENTS

| | | |
|---|---|---|
| 1,566,772 | Roth | Dec. 22, 1925 |
| 2,459,986 | Worden | Jan. 25, 1949 |
| 2,471,784 | Seifner et al. | May 31, 1949 |
| 2,544,544 | Qualley et al. | Mar. 6, 1951 |
| 2,683,796 | Koff | July 13, 1954 |